(12) United States Patent
Zhang et al.

(10) Patent No.: US 9,874,950 B2
(45) Date of Patent: Jan. 23, 2018

(54) ADAPTIVE GUIDELINES FOR HANDWRITING

(71) Applicant: Lenovo (Singapore) Pte. Ltd., Singapore (SG)

(72) Inventors: Jianbang Zhang, Cary, NC (US); Steven Richard Perrin, Raleigh, NC (US); Russell Speight VanBlon, Raleigh, NC (US); Joshua Neil Novak, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/550,032

(22) Filed: Nov. 21, 2014

(65) Prior Publication Data

US 2016/0148046 A1    May 26, 2016

(51) Int. Cl.
```
G06K 9/00      (2006.01)
G06F 3/0354    (2013.01)
G06F 3/0488    (2013.01)
G06K 9/32      (2006.01)
```

(52) U.S. Cl.
CPC ...... *G06F 3/03545* (2013.01); *G06F 3/04883* (2013.01); *G06K 9/00402* (2013.01); *G06K 9/3283* (2013.01); *G06K 2209/01* (2013.01)

(58) Field of Classification Search
CPC .............. G06F 3/04883; G06F 17/245; G06K 9/00402; G06K 9/222

USPC ................................................. 382/187–189
See application file for complete search history.

(56) References Cited

U.S. PATENT DOCUMENTS

| | | | | |
|---|---|---|---|---|
| 5,774,582 A | * | 6/1998 | Gat ........................ | G06K 9/32 382/177 |
| 7,751,623 B1 | * | 7/2010 | Simmons .............. | G06F 17/242 345/173 |
| 7,825,922 B2 | * | 11/2010 | Keely ................... | G06F 3/0481 345/179 |
| 9,021,403 B2 | * | 4/2015 | Cho ...................... | G06F 3/04883 715/773 |
| 2003/0161532 A1 | * | 8/2003 | Akiyama ............... | G06K 9/222 382/187 |
| 2010/0225602 A1 | * | 9/2010 | Fujimura ................ | G06F 3/038 345/173 |
| 2014/0267072 A1 | * | 9/2014 | Andersson .......... | G06F 3/04883 345/173 |
| 2015/0234588 A1 | * | 8/2015 | Andersson .......... | G06F 3/04883 382/187 |
| 2017/0060819 A1 | * | 3/2017 | Rucine ............... | G06K 9/00402 |
| 2017/0091153 A1 | * | 3/2017 | Thimbleby ........... | G06F 17/212 |

* cited by examiner

*Primary Examiner* — Wesley Tucker
(74) *Attorney, Agent, or Firm* — Ference & Associates LLC

(57) ABSTRACT

One embodiment provides a method, involving: receiving, at a device, handwriting input from a user; detecting, using a processor, a location of at least a part of the handwriting input; and providing, on a display device, at least one adaptive line to guide the handwriting input; wherein the at least one adaptive line is positioned based on the location of at least a part of the handwriting input. Other aspects are described and claimed.

19 Claims, 4 Drawing Sheets

ADAPTIVE GUIDELINES FOR HANDWRITING

BACKGROUND

Since the development of the first electronic device, designers have been trying to create a method of interaction that feels natural and smooth. One of the most basic methods of human communication is handwriting. Thus tools were built to interpret human handwriting on a touch sensitive surface. The problem with these existing tools is ensuring the software can correctly interpret the handwriting input. It is known that electronic devices have a significant increase in the percent of correct matches when analyzing handwriting input that is written in a straight line. Even a tilt as small as 5 to 10 degrees may cause errors in the analysis and impact an electronic device's chance of correctly recognizing a user's handwriting input.

In order to have the user input their handwriting in the straightest way possible some methods make use of static lines, similar to ruled paper. However, due to the various types of input electronic devices can take and the various different languages users may input, no single spacing method is sufficient for every user.

BRIEF SUMMARY

In summary, one aspect provides a method, comprising: receiving, at a device, handwriting input from a user; detecting, using a processor, a location of at least a part of the handwriting input; and providing, on a display device, at least one adaptive line to guide the handwriting input; wherein the at least one adaptive line is positioned based on the location of at least a part of the handwriting input.

Another aspect provides an information handling device, comprising: a processor; a memory device that stores instructions executable by the processor to: receive handwriting input from a user; detect a location of at least a part of the handwriting input; and provide at least one adaptive line to guide the handwriting input; wherein the at least one adaptive line is positioned based on the location of at least a part of the handwriting input.

A further aspect provides a product, comprising: a storage device having code stored therewith, the code being executable by the processor and comprising: code that receives, at a device, handwriting input from a user; code that detects, using a processor, a location of at least a part of the handwriting input; and code that provides, on a display device, at least one adaptive line to guide the handwriting input; wherein the at least one adaptive line is positioned based on the location of at least a part of the handwriting input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
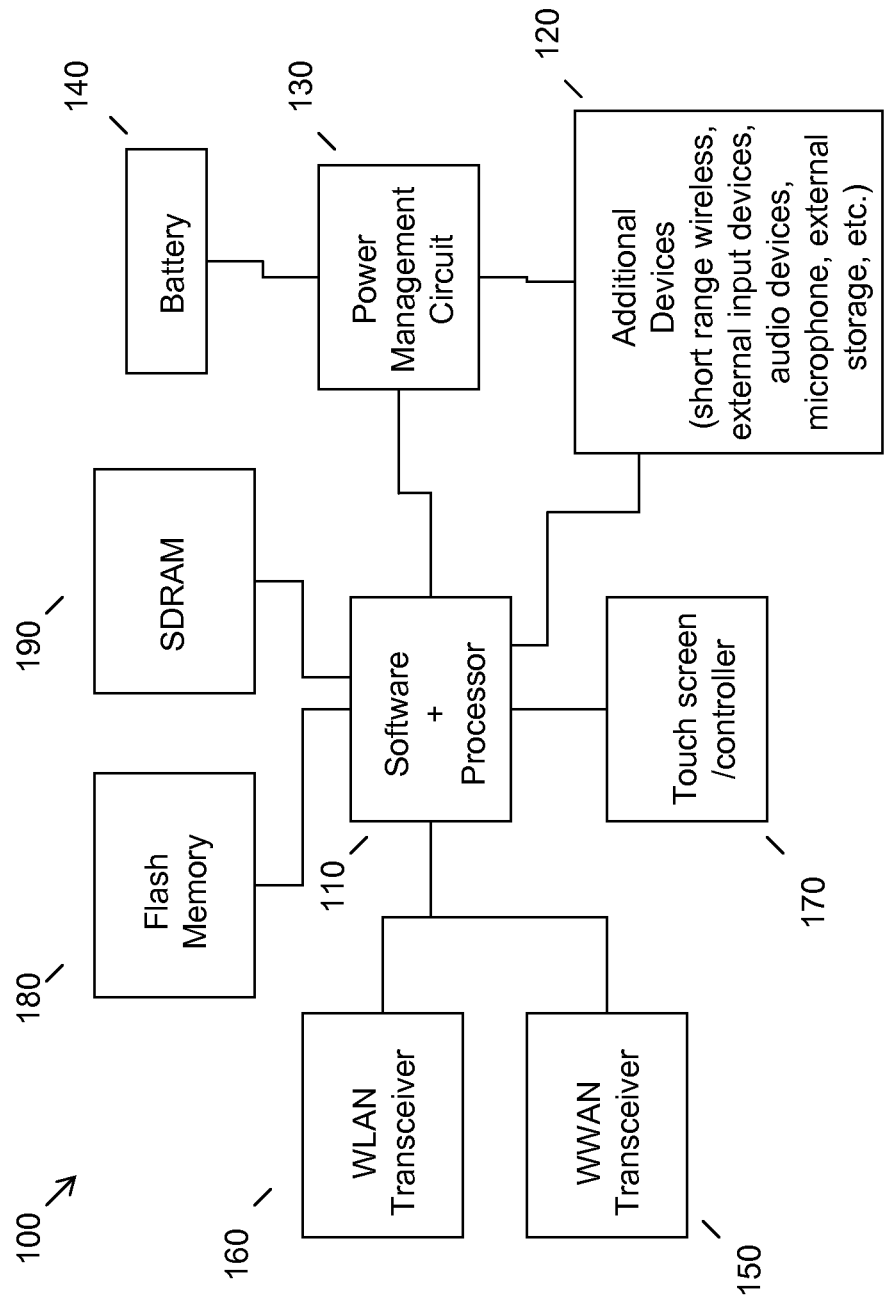
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although off-line handwriting recognition (i.e., the recognition and conversion of text in an image into letter codes usable within computer and text-processing applications) has been around for a long time, on-line recognition is relatively newer. On-line handwriting recognition involves the automatic conversion of text as it is written on a device (e.g., tablet, smartphone, PDA, etc.). Typically, a sensor picks up the location of the tip of a writing device, (e.g., finger, stylus, etc.) and tracks the movement. This movement tracking is converted into letter codes which are usable within computer and text-processing applications.

Current handwriting recognition software can suffer from incorrect conversions when the user's handwriting it skewed. Skewing is an extremely prevalent problem in handwriting recognition, because the way people write on paper and the way they interact with electronic devices can differ greatly. Additionally, electronic devices are typically being held in one hand while the second hand inputs the handwriting into the device. This two handed method can lead to the device being skewed from what would feel natural for the second hand to write on. Moreover, most surfaces of electronic devices (e.g., touch screens, etc.) are very smooth and not conducive to accurate penmanship.

In order to combat the issue of skewed input some existing applications make use of static lines or a grid system to guide the user. Similar to ruled paper, static lines help the user to input their handwriting in a straighter formant, thus increasing the accuracy of the handwriting analysis, in terms of recognition. However, the introduction of static lines can create other subsequent problems. For example, although the static line is straight, it may still be uncomfortable or impossible for the user to input their handwriting at that angle or within the given area. This could be due to multiple factors like, for example, the issue mentioned above of holding the device in one hand while attempting to input the user's signature or other text with the second hand.

Additionally, the static lines may be too close together or too far apart to optimally guide the user in imputing his or her handwriting. Thus, a method for providing adaptive guidelines to the user is needed.

Accordingly, an embodiment provides, upon receiving handwriting input from the user, an adaptive line or lines to guide the user in inputting the handwriting. The adaptive line(s) may adjust with regard to tilt of the device (with respect to level), angle of the device (with respect to normal), adjust based on historical data (history of user inputs) and/or adjust based on the real-time input of the user.

In an embodiment, a single adaptive line may be provided, e.g., underneath the user's input. Additionally or alternatively, an embodiment may provide two or more adaptive lines, e.g., simulating ruled paper. However, the two or more adaptive lines may be adjusted, similar to the positioning of a single adaptive line.

For example, to guarantee the best text recognition accuracy, guidelines may be used to guide users to write straight. The guidelines may be automatically displayed in the area where the user is writing.

In order to provide the most comfortable guideline space for user, an embodiment introduces a method composed of continuously collecting a user's handwriting input data and calculating the best line spacing based on the data collected and analyzed. By continuously collecting user's handwriting input data and analyzing its characteristics, the handwritten size for each character is recorded. Using this data, the average handwritten text height can be calculated by algorithms such as the average value of all the handwritten text height or mean value based on the data distribution.

For example, with the mean handwritten text height, the target line space may be assumed using formula:

$$D=H+\Delta$$

where D is the target line space, H is the mean handwritten text height, and Δ is a positive configurable value, e.g., to make sure line space is bigger than the input handwriting size. This Δ value may be predefined but relevant to some other factors such as the display DPI, etc. If a user is actively writing in a line, the line space may be enlarged for this active line or multiple lines below. So the Δ value may be used in to this situation.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering, such as for inputting handwriting and providing adaptive guidelines, as described herein. System 100 also typically includes various memory devices, for example flash memory 180 and SDRAM 190.

Figure 2:
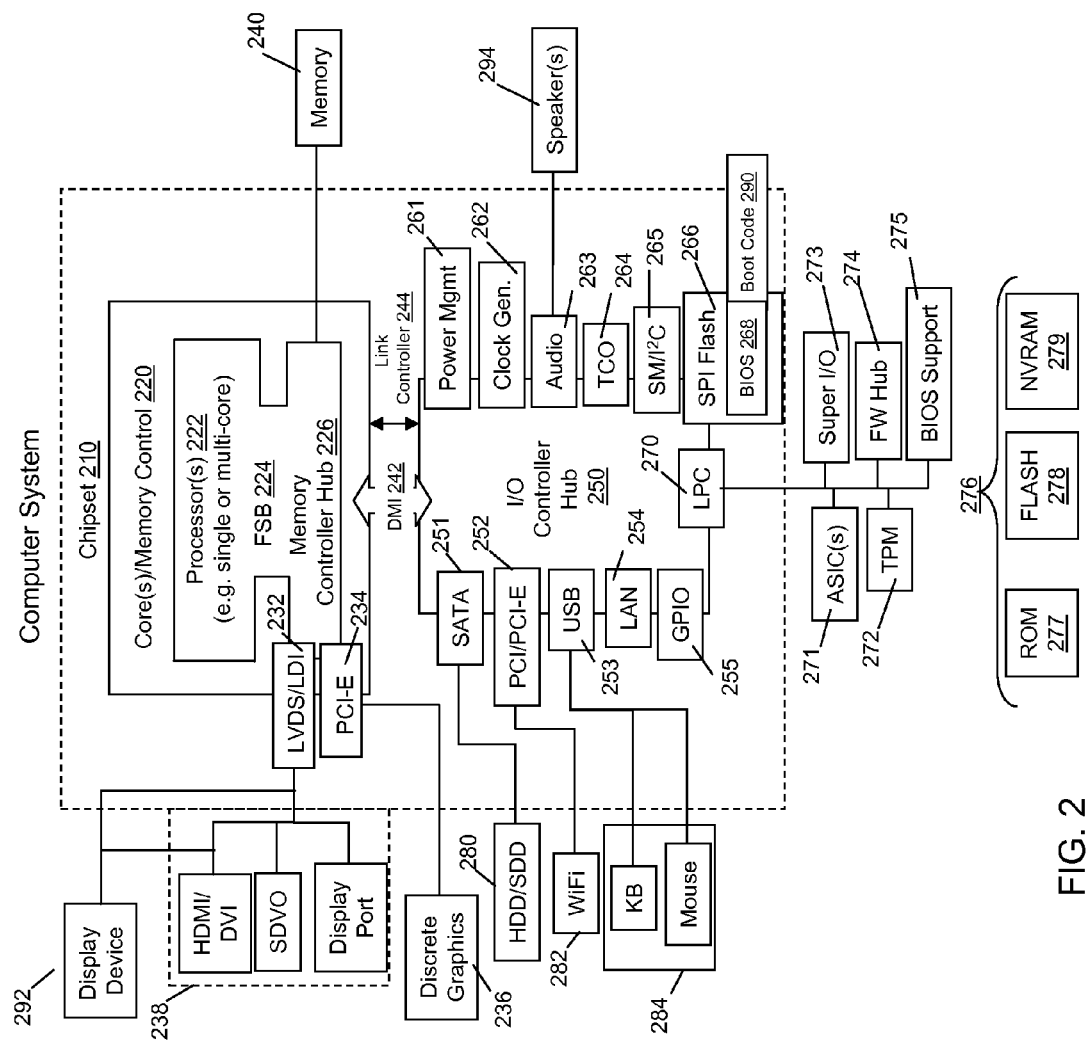
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to enter, record, or modify data. For example, the circuitry outlined in FIG. 1 may be implemented in a tablet or smart phone embodiment, whereas the circuitry outlined in FIG. 2 may be implemented in a personal computer embodiment.

Figure 3:
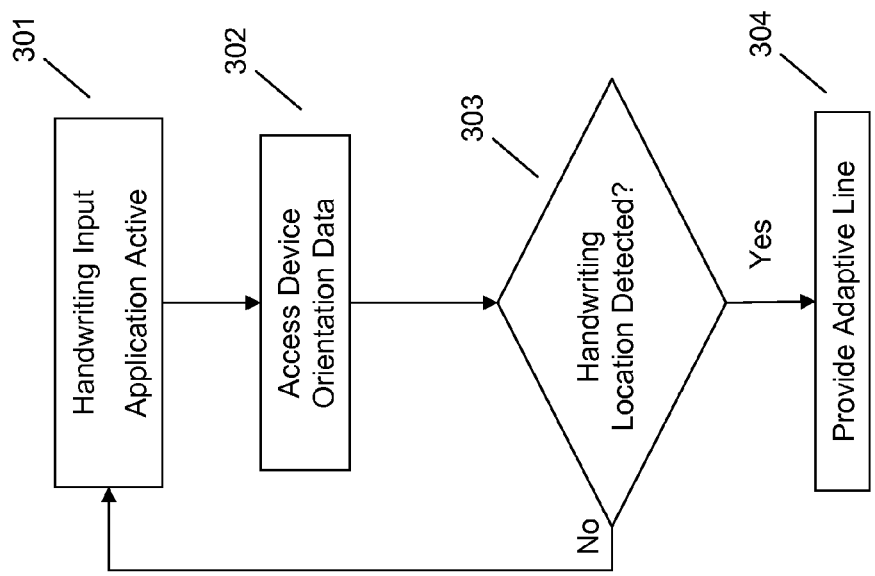
FIG. 3 illustrates an example method of providing an adaptive guideline for handwriting.

Referring now to FIG. 3, in an embodiment, an application is launched that can receive user input in the format of handwriting 301. With the application active, an embodiment detects or accesses device orientation data at 302, e.g., tilt of the device, angle of the device with respect to the user, etc. This device orientation data accessed at 302 permits an embodiment to ascertain the position of the device (e.g., relative to the user).

If an embodiment detects that the user enters handwriting input at an information handling device at 303, a processor then detects a location of at least part of the handwriting input (e.g., where the user initiates the beginning of the handwriting input, the mean or average center of the handwriting input character, etc.). Additionally or alternatively, the information handling device at 303, could detect if a pen or finger is within the over range of the device (e.g., within a predetermined range to receive touch input without physically touching the screen, or if an input tool (e.g., pen, stylus, or the like) is removed/ejected from the device itself. If no input is detected, the application may not provide an adaptive line or adjust the existing pre-defined line location. The pre-determined line location can be determined based on stored data relating to the handwriting characteristics of a user, application preferences, or the like as described herein. However, if handwriting input is detected, an embodiment provides an adaptive line at 304, e.g., based on the determined location of the handwriting input and any available device orientation data.

The adaptive line provided at 304 on the basis of the detected handwriting may take a variety of forms. In an embodiment, the handwriting input may be detected at 303 and an adaptive line provided in real-time at 304. This may correspond to adjusting the position, angle and/or spacing in an adaptive fashion as the user begins to input and continues to input handwriting.

Figure 4:
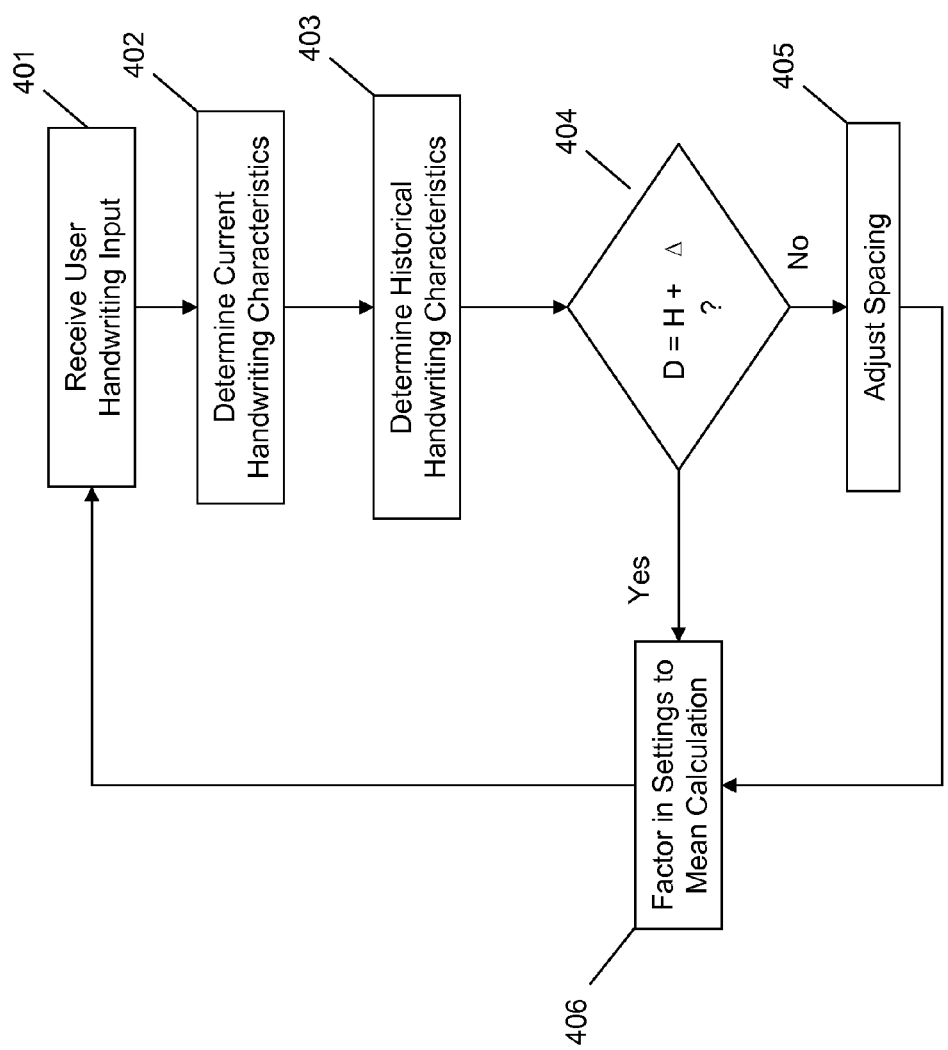
FIG. 4 illustrates an example method of providing adaptive guidelines for handwriting.

In another embodiment, referring now to FIG. 4, handwriting input is received from a user at 401, for example using a touch screen 170. The handwriting input may be in a variety of formats, e.g., numbers, lower and upper case letters, symbols, characters, or ascender and descender portions of letters. The handwriting input may be entered using a variety of modalities/types (e.g., by a pen, a stylus, a finger, or the like).

In an embodiment, the area designed for the user to enter their handwriting may be capped above and below by two or more adaptive lines. This helps the user ensure that all of their input characters are of uniform size. Uniform character size is important for proper handwriting recognition (e.g., it helps differentiate between capital and lowercase letters and the like). These adaptive lines, just like the single line detailed herein, can be adapted based on the user's needs or preferences.

The distance between the upper and lower boundary lines ("a first line" and "a second line") may be determined in a variety of ways, e.g., adaptive to the user. As described herein, in an embodiment, the system may determine the current handwriting characteristics at 402 (e.g., in real time) as well as store data regarding the handwriting characteristics of a user (e.g., height of upper case and lower case letters, the user's typically angle of input, device orientation, etc.), that may be determined at 403. Each or these, either alone or in combination, may be used by an embodiment to determine if the spacing for the adaptive lines is appropriate at 404.

By way of example, an embodiment may determine if the height of the spacing (D) is equal to the height of the user's current and/or historical handwriting average height, plus some additional space, at 404. If so, spacing for the adaptive lines may be maintained and this data stored at 406 for further use, e.g., as historical data. Otherwise, if an embodiment determines that the spacing needs to be adjusted (i.e., D is determined to be too large or too small), an embodiment may adjust the spacing of the adaptive lines at 405.

An embodiment may perform this analysis on an on-going basis in order to profile a user and provide adaptive line(s) for the user that is matched to previous inputs. Additionally or alternatively, an embodiment may adapt in real-time to the user's handwriting and adjust, e.g., to ensure accurate hand writing analysis, to provide the user with the most comfortable input experience.

As with the case of a single guideline, an embodiment may monitor the relative position of the information handling device that is receiving the user handwriting input and factor in this analysis to adjust the lines, e.g., their tilt. For example, by utilizing an accelerometer or the like sensor(s), the device can determine if it is being held at upright, laying down on a surface, or being held and an angle. An embodiment can utilize this information to determine if the adaptive line should be altered in anyway (e.g., tilting the line to accommodate for the device being held at an angle) to improve the user's ability to follow the guidelines more easily. This improves the accuracy of the analysis of the user's handwriting as it normalizes the handwriting, reducing the number of variables that may affect proper recognition of the handwriting input. Additionally or alternatively, an embodiment can detect 402 at the beginning of the user's handwriting input the angle relative to normal at which the user is writing.

In an embodiment, the mean values stored for the user can be tied to a particular user. For example, if multiple people use the same tablet in a retail setting, each employee would have his or her own profile, and the mean text height value would be associated to each independent profile. This would ensure that the mean calculation function would continue to be useful for devices that are required to support multiple users.

The adaptive line or lines could also continue to track the user's writing and make adjustments in real time 405. For example, if a user were to begin writing while holding the information handling device in an awkward position, but midway through the input process is able to the shift the device to a more natural angle, the adaptive line could make minor adjustments 405 to ensure the user is not forced to continue to write in an uncomfortable or awkward manner.

Additionally, an embodiment, may determine based on the user's handwriting input to the touch screen device 170, what type of input the user is received at 401. For example, the user could be entering numbers, lower and upper case letters, punctuation symbols, control codes, or white space. In an embodiment, the device could implement that additional information to further aid the user in imputing data. By way of example, a user could be entering text in a box that only correlated to numbers. Thus, a user would not be entering lowercase letters, and would not benefit from a dashed centered line for lowercase letter guidance. In a further embodiment, the line spacing could be adjusted 405 to accommodate the spacing and height requirements of numbers as opposed to general sentence structure.

Additionally or alternatively, an embodiment may use the information gathered based on the user's handwriting input to the touch screen device 170 to determine what language the user was writing in. In order for analysis of complex scripts (e.g., Chinese, Korean, etc.) it may be required for the user to write with larger character spacing or with larger overall characters. For example, if a user were to begin writing with the Chinese alphabet, an embodiment may adjust the line or lines spacing 405 or rotate the adaptive lines 90 degrees 304 to accommodate a vertically written script.

In one embodiment, the information gathered based on the user's handwriting input to the touch screen device 170 may be used to determine what method of input the user is using. Typical touch screens or touch sensitive devices can allow the use of a stylus. Depending on the technology implemented for the touch device (e.g., capacitive, resistive, etc.) the input device can vary. An embodiment may adapt the line in a manor more conducive to the type input or input device being used. For example, if a user were to begin writing with a stylus, an embodiment may adjust the line or lines spacing 405 to be narrower because typically a user has more control when writing with a pen or pen like device. Alternatively, for example, if a user were to begin writing with a their finger, an embodiment may adjust the line or lines spacing 405 to be wider because typically a user has less control, or can be less precise when writing with a their finger.

In an embodiment, information from a third party application could be used to determine what the preset or default characteristics of the adaptive lines should be. For example, an email application may assume the user is entering textual characters in a sentence structure, and would thus alter the characteristics accordingly. Alternatively, a calculator application would be expecting the user to enter only numerical values, and thus would alter the characteristics accordingly.

In another embodiment, a method may record the characteristics of any previous entries made on the device 406 and use those characteristics to create a starting point for the adaptive lines to appear on a display device (e.g., a user with larger handwriting would begin with a larger area). Based on this preexisting information, an embodiment may take a best guess at what the orientation and spacing of the lines should be. Then, an embodiment, based on user input and real-time analytics may determine that the preexisting information was not going to be the optimal settings 404 for the current collection of user handwriting. Thus, an embodiment may make changes in real-time similar to those outlined herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a device, handwriting input from a user in response to an application field that can accept handwriting input being active;
   detecting, using a processor, a location of at least a part of the handwriting input;
   providing, on the display device, at least one adaptive line to guide the handwriting input based on the location of at least a part of the handwriting input and an orientation of the device; and
   adjusting the at least one adaptive line based upon a detected change, during provision of the handwriting input, to the orientation of the device, wherein the adjusting comprises adjusting the at least one adaptive line during the provision of the handwriting input.

2. The method of claim 1, wherein positioning of the at least one adaptive line is further determined based on an initial angle of the handwriting input.

3. The method of claim 1, wherein the at least one adaptive line comprises a first line and a second line, the first line and the second line being separated by a distance.

4. The method of claim 3, further comprising: positioning the first and second line based on samples of user handwriting.

5. The method of claim 4, wherein the positioning of the first and second line is based upon historical handwriting samples specific to an individual user.

6. The method of claim 3, further comprising positioning the first and second line based on real-time input of user handwriting.

7. The method of claim 3, wherein the distance between the first and second line is based on a third party application preference.

8. The method of claim 1, further comprising:
   determining a character type being input based on the application field; and
   selecting the at least one adaptive line from a group of adaptive lines based on the character type.

9. The method of claim 3, further comprising:
   determining a language being input based on the handwriting input; and
   positioning the first and second line based on the language.

10. An information handling device, comprising:
    a display device;
    a processor;
    at least one sensor;
    a memory device that stores instructions executable by the processor to:
    receive handwriting input from a user in response to an application field that can accept handwriting input being active;
    detect a location of at least a part of the handwriting input;
    provide at least one adaptive line to guide the handwriting input based on the location of at least a part of the handwriting input and an orientation of the device; and
    adjusts the at least one adaptive line based upon a detected change, during provision of the handwriting input, to the orientation of the display device, wherein the instructions executable by the processor to adjust comprise instructions executable by the processor to adjust the at least one adaptive line during the provision of the handwriting input.

11. The information handling device of claim 10, wherein the at least one adaptive line is positioned based on an initial angle of the handwriting input.

12. The information handling device of claim 10, wherein the at least one adaptive line comprises a first line and a second line, the first line and the second line being separated by a distance.

13. The information handling device of claim 12, further comprising instructions executable by the processor to position the first and second line based on samples of user handwriting.

14. The information handling device of claim 12, further comprising instructions executable by the processor to position the first and second line based on historical handwriting samples specific to an individual user.

15. The information handling device of claim 12, further comprising instructions executable by the processor to position the first and second line based on real-time input of user hand writing.

16. The information handling device of claim 10, further comprising instructions executable by the processor to:
    determine an input type for the application field; and
    select the at least one adaptive line from a group of adaptive lines based on the input type.

17. The information handling device of claim 12, wherein the distance between the first and second line is based on a third party application preference.

18. The information handling device of claim 12, further comprising instructions executable by the processor to position the first and second line based on a factor selected from the group consisting of: language being input, and character type being input.

19. A product, comprising:
    a storage device having code stored therewith, the code being executable by the processor and comprising:
    code that receives, at a device, handwriting input from a user in response to an application field that can accept handwriting input being active;
    code that detects, using a processor, a location of at least a part of the handwriting input;
    code that provides, on the display device, at least one adaptive line to guide the handwriting input based on the location of at least a part of the handwriting input and an orientation of the device; and
    code that adjusts the at least one adaptive line based upon a detected change, during provision of the handwriting input, to the orientation of the device, wherein the code that adjusts comprises code that adjusts the at least one adaptive line during the provision of the handwriting input.

* * * * *